(12) United States Patent
Baumbach

(10) Patent No.: US 6,827,487 B2
(45) Date of Patent: Dec. 7, 2004

(54) TEMPERATURE MEASURING DEVICE

(76) Inventor: Per Lennart Baumbach, 64B Beach Road, Castor Bay, Auckland (NZ)

( * ) Notice: Subject to any disclaimer, the term of this patent is extended or adjusted under 35 U.S.C. 154(b) by 0 days.

(21) Appl. No.: 10/468,133

(22) PCT Filed: Feb. 15, 2002

(86) PCT No.: PCT/EP02/01631
§ 371 (c)(1),
(2), (4) Date: Aug. 15, 2003

(87) PCT Pub. No.: WO02/066946
PCT Pub. Date: Aug. 29, 2002

(65) Prior Publication Data
US 2004/0076215 A1 Apr. 22, 2004

(30) Foreign Application Priority Data
Feb. 16, 2001 (GB) .............................. 0103886

(51) Int. Cl.⁷ .............................. G01K 7/42; A61B 5/01; A61B 5/0205
(52) U.S. Cl. .......................... 374/164; 374/30; 374/163; 374/178; 374/179; 374/183; 600/549; 600/528; 600/323
(58) Field of Search ............................. 374/30, 43, 44, 374/163, 164, 178, 179, 183; 600/549, 528, 586, 398–405, 323

(56) References Cited

U.S. PATENT DOCUMENTS

| 3,933,045 | A |   | 1/1976  | Fox et al.       |         |
|-----------|---|---|---------|------------------|---------|
| 4,129,125 | A | * | 12/1978 | Lester et al.    | 600/484 |
| 4,493,564 | A | * | 1/1985  | Epstein          | 374/179 |
| 4,539,994 | A |   | 9/1985  | Baumbach et al.  |         |
| 4,913,150 | A | * | 4/1990  | Cheung et al.    | 600/323 |
| 4,955,380 | A | * | 9/1990  | Edell            | 600/355 |
| 5,634,720 | A | * | 6/1997  | Gallup et al.    | 374/183 |
| 5,813,982 | A | * | 9/1998  | Baratta          | 600/398 |
| 5,884,235 | A | * | 3/1999  | Ebert            | 702/87  |
| 6,146,015 | A |   | 11/2000 | Weiss            |         |
| 6,220,750 | B1| * | 4/2001  | Palti            | 374/164 |
| 2002/0150143 | A1 | * | 10/2002 | Tokita et al. | 374/163 |

FOREIGN PATENT DOCUMENTS

| DE | 3527942     | 2/1987  |
| GB | 2266771 A   | 11/1993 |
| WO | WO 00/58702 | 10/2000 |

* cited by examiner

Primary Examiner—Diego Gutierrez
Assistant Examiner—Stanley J. Pruchnic, Jr.
(74) Attorney, Agent, or Firm—Altera Law Group, LLC

(57) ABSTRACT

A device for measuring the temperature within a body from a body surface at a different temperature, comprising: a heat shield for application to the body surface, comprising an outer heat-conducting portion (52), and an inner heat-insulating portion (50); a heater or cooler (41) to heat or cool the outer portion (52) of said heat shield to the temperature of the body surface; a first temperature sensor (37) positioned on a surface of the inner heat-insulating portion (50) of the heat shield which is applied to the body surface; a second temperature sensor (38) positioned to measure the temperature of the outer portion (52) of the heat shield; a heater or cooler control circuit to heat or cool the outer portion (52) of the heat shield towards the temperature measured by the first the first temperature sensor (37); and a second control circuit to forecast the first temperature sensor (37) equilibrium temperature.

33 Claims, 9 Drawing Sheets

TEMPERATURE MEASURING DEVICE

FIELD OF THE INVENTION

The present invention relates to a temperature measuring device for measuring the temperature within a body from a surface of the body.

BACKGROUND OF THE INVENTION

A need exists for the measurement of the temperature within a body from a surface of the body where an internal temperature measurement is necessary, but the inside of the body is inaccessible, or access to the inside of the body would be inconvenient. Examples of such bodies include human and animal bodies and industrial process tanks, for example fermentation tanks or tanks containing corrosive media.

Body temperature is the parameter most frequently measured in patients who are ill or who feel ill. However, there are disadvantages with all of the currently available methods of measuring body temperature. Temperature measurements aim for readings which reflect the core or deep body temperature, an average of the temperatures of the core portions of the body as reflected by the temperature of blood in the major vessels. However, these parts of the body are not readily accessible and body temperature measurements are normally sublingual, axillary or rectal. For various reasons, these locations do not accurately reflect core temperature. Measurements taken under the tongue are sensitive to changes in temperature caused by eating, drinking, oral medication or mouth-breathing, and to incorrect thermometer position. Measurements taken in the armpit are generally lower than the true deep body temperature. Measurements taken rectally are affected by factors including coliform bacterial activity, haemorrhoids, colitis, depth of measurement or presence of faeces.

There are other disadvantages associated with measuring temperature in these locations. Sublingual measurements require 3–4 minute readings and are unsuitable for young children due to the risk of biting. Axillary measurements require 8–11 minute readings. Rectal measurements carry the risk of rectal perforation, may result in cross-contamination if the thermometer is not properly sterilised, and are invasive. Neither sublingual or rectal measurement is considered suitable for measuring the temperature of neonates or premature babies, and usually skin temperature is measured in these cases, giving results which do not accurately reflect deep body temperature.

Accurate deep body temperatures are currently monitored on critically ill patients in Intensive Care Units or operating theatres by means of pulmonary, oesophageal or bladder thermistor catheters, but these are invasive methods which are unsuitable for routine temperature monitoring.

The traditional glass/mercury thermometer is currently being phased out due to the inherent dangers of these materials, and being replaced with electronic stick fever thermometers. These stick thermometers offer faster digital readouts with an audible signal to indicate that a steady value has been reached, and give more accurate results than glass/mercury thermometers, but are still invasive.

The drive for faster and preferably minimally invasive or non-invasive thermometers has opened a large market for optical ear canal infrared thermometers which measure thermal radiation from the tympanic membrane. However, tympanic measurements quite often give inaccurate results in clinical use. This is mainly due to operator error, for example directing the measurement light beam at cooler parts of the ear canal such as skin or ear wax, and/or physiological variations in brain and ear canal temperature. Fouling of the optics may also be a contributing factor to the inaccuracy of these devices. A difference of 1° C. can often be seen between the ears of the same patient. Tympanic measurements are particularly unpleasant for children under the age of two, because of the small diameter of their ear canals.

Consequently, there is a need for thermometers which record an accurate deep body temperature, whilst avoiding invasive techniques, so as to minimise discomfort to the patient.

A non-invasive deep body temperature measurement technique was developed in the 1970s by Dr. R. H. Fox, and is disclosed in U.S. Pat. No. 3,933,045. This thermometer, the "Fox probe", consists of a semi-infinite heat shield established over a temperature measuring device which is held in contact with the skin surface. Controlling the temperature of the heat shield such that its temperature is equal to the surface sensor temperature establishes a zero heat flux within the probe structure, and thus also between the surface sensor and the deep body temperature, forcing the surface sensor towards the deep body temperature. The Fox probe was developed into an embodiment with a heat shield in the form of a heat-conducting cup, heated to the same temperature as the skin, wherein the rim of the cup is in contact with the edge of the heat shielded area of skin, as disclosed in U.S. Pat. No. 4,539,994. This helps to prevent lateral heat loss from the part of the body beneath the heat shield through the skin outside the heat shield, which will prevent equilibrium from being reached. This embodiment provides a practical alternative to the use of a very large (effectively infinite) heat shield around the skin temperature sensor. The Fox probe heat-conducting cup is filled with air or a heat-insulating compound to avoid thermal coupling between the heat shield and the skin sensor. Without thermal insulation between the heat shield and the skin sensor, a temperature control overshoot could cause an increase in temperature of the skin sensor, and a thermal runaway situation could occur.

The classical and improved versions of the Fox probe are large (e.g. 45–60 mm diameter) and have a substantial settling time (several minutes), and thus they are best suited to long term deep body temperature trend monitoring in intensive care. They have not been widely adopted for individual, routine patient temperature readings due to the long settling time and non-portable design. Further, they are rarely used for temperature monitoring during surgical procedures, where small, invasive catheter probes are generally preferred.

A Fox probe suitable for measuring deep body temperature from a surface which is hotter or cooler than the deep body temperature is disclosed in GB-A-2266771. This probe is stated to be applicable to measurement of skin temperature.

WO 00/58702 discloses an apparatus for measuring deep body temperature comprising a capsule for application to a body surface, having a heat-conducting interior and thermally insulated surfaces. A heating element is used to heat the inside of the capsule, and two temperature sensors measure the temperature at two points inside the capsule. When the temperature recorded by the sensors is equal, this temperature reading should be equivalent to the deep body temperature. I have appreciated that this apparatus has the disadvantages that when measuring animal body temperature lateral blood flow may cause heat loss so that the temperature reading is below deep body temperature, and that it is possible for the temperature sensors to be heated by the heater to the same temperature without being in equilibrium with the core if they are heated too quickly Particularly serious inaccuracy is likely when fast initial heating is carried out and the equilibrium position is estimated by extrapolation as proposed in the application. The effect will be of most significance when measuring the temperature of obese patients, as subcutaneous fat acts a heat insulator between the body core and measurement apparatus.

DE-A-3527942 discloses an apparatus similar to that of WO 00/58702. It is disclosed that the heater may be preheated.

SUMMARY OF THE INVENTION

In a first aspect, the present invention provides a temperature measuring device for measuring the temperature within a body from a surface of the body which is at a lower temperature, said device comprising:

a heat shield for application to the surface of the body, comprising an outer heat-conducting portion, and an inner heat-insulating portion, both said portions having a surface for contacting said surface of the body;

a heater positioned to heat the outer portion of said heat shield to the temperature of the surface of the body so as to annul heat flow from a measurement location within the area of said surface to which the heat shield is applied, said heater being close to said surface of the outer portion of the heat shield which is applied to the surface of the body compared with its distance from an opposite surface of the outer portion of the heat shield;

a first temperature sensor positioned on said surface of the inner heat-insulating portion of the heat shield which is for contacting the surface of the body to measure the temperature of said surface at said measurement location;

a second temperature sensor positioned to measure the temperature of said outer portion of the heat shield;

a first electronic control circuit serving to operate said heater so as to raise the temperature of said outer portion of the heat shield as measured by said second temperature sensor towards the temperature at said measurement location as measured by said first temperature sensor; and a second electronic control circuit serving to extrapolate changing temperatures measured by said first temperature sensor to forecast what the temperature at said measurement location would be at thermal equilibrium.

The heater preferably consists of an electrically resistive heating element in contact with said heat shield, for example a resistance wire coiled around said heat shield. Said heating element may optionally be embedded in said heat shield. In use, the thermal gradient from the heater to the part of the heat shield in contact with the body surface should be minimised to prevent falsely low temperature readings. This may be achieved by placing the heater close to the part of the heat shield designed for application to the surface of the body, for example by coiling a wire around the cup wall in a recess.

Said temperature measuring device may optionally further comprise a user-operated control to activate said heater to preheat the heat shield to a temperature about 20% below an expected temperature measurement. When a said temperature measurement device is used to determine human body temperature (about 37° C.), the preheating temperature is preferably between 28 and 34° C., and more preferably about 30° C. Preferably, a burn safety shutdown feature is included in a said temperature measurement device which prevents heating above a maximum temperature. When a said temperature measurement device is used to determine human body temperature, said maximum temperature is preferably about 45° C.

In a second aspect, the present invention provides a temperature measuring device for measuring the temperature within a body from a surface of the body which is at a higher temperature, said device comprising:

a heat shield for application to the surface of the body, comprising an outer heat-conducting portion, and an inner heat-insulating portion, both said portions having a surface for contacting said surface of the body;

a cooler positioned to cool said heat shield to the temperature of the surface of the body so as to annul heat flow to a measurement location within the area said surface to which the heat shield is applied, said cooler being close to said surface of the outer portion of the heat shield which is applied to the surface of the body compared with its distance from an opposite surface of the outer portion of the heat shield;

a first temperature sensor positioned on said surface of the inner heat-insulating portion of the heat shield which is for contacting the surface of the body to measure the temperature of said surface at said measurement location;

a second temperature sensor positioned to measure the temperature of said outer portion of the heat shield;

a first electronic control circuit serving to operate said cooler so as to lower the temperature of said outer portion of the heat shield as measured by said second temperature sensor towards the temperature at said measurement location as measured by said first temperature sensor; and a second electronic control circuit serving to extrapolate changing temperatures measured by said first temperature sensor to forecast what the temperature at said measurement location would be at thermal equilibrium.

Generally, those features described in connection with the first aspect of the invention may optionally be used in the second aspect of the invention, for example said temperature measuring device may optionally further comprise a user-operated control to activate said cooler to precool the heat shield to a temperature about 20% above an expected temperature measurement. Preferably, a safety shutdown feature is included in a said temperature measurement device of the second aspect of the invention which prevents cooling below a minimum temperature.

In either aspect of the invention, said heater or said cooler may be a Peltier effect heat pump. Where a Peltier effect heat pump is used as a cooler, the warm side of the heat pump element is preferably soldered to a heatsink, for example a metal casing.

The heat conductivity of said heat-conducting portion of the heat shield should be as large as possible, so as to lower the thermal resistance of the path between the heater and second temperature sensor. This allows the temperature of the heat-conducting portion of the heat shield to follow the temperature detected by the first temperature sensor as rapidly and accurately as possible, avoiding temperature lag or initial temperature overshoot which may confuse the predictive circuitry, increasing the time needed for a reliable temperature reading. The heat conductivity of said heat-conducting portion of the heat shield is preferably at least 20

W/mK. Materials having suitable thermal conductivities are shown in the following table:

| Material | Thermal Conductivity (W/mK) | Heat capacity (J/cm$^3$K) |
| --- | --- | --- |
| Silver | 428 | 2.50 |
| Copper | 390 | 3.43 |
| Aluminium | 236 | 2.55 |
| Stainless steel | 24 | 3.93 |
| Alumina | 25 | 2.71 |
| Beryllia | 250 | approx. 3 |
| Aluminium nitride | 170 | approx. 3 |

The heat-conducting portion of the heat shield may be constructed from heat-conducting metal (for example, copper, brass or stainless steel) or heat-conducting ceramic material (for example alumina, beryllia or aluminium nitride), or passivated silicon, or silicon-on-sapphire, or other known heat-conductive micro-mechanical construction materials. Copper offers the advantages of low cost, good thermal conductivity, solderability and suitability for chromium plating, which should be carried out on exposed surfaces to prevent oxidation and to provide a non-allergenic skin contact. Solderability is a desirable property for the heat-conducting portion of a heat shield of the present invention as, if the heater and second temperature sensor are soldered to the heat-conducting portion of the heat shield, the thermal resistance of the path between them will be considerably lower than it will be if the components are attached with a polymer adhesive (thermal conductivity of solder is 41 W/mK, whereas thermal conductivity of polymers is typically 0.04–0.4 W/mK). Stainless steel and aluminium are both inert and biocompatible, but are difficult to solder.

Heat-conducting ceramic materials such as alumina, beryllia and aluminium nitride are electrical insulators. This allows said heater and/or said temperature sensor to be formed directly on the surface of the heat shield by application of platinum, nickel or gold (which may be etched or laser cut into a spiral or meandering resistor pattern) using thin-film metallisation techniques such as sputtering, or by printing and firing of thick-film inks of metals, particularly precious metals or alloys or oxides thereof such as platinum or gold metallo-organic inks, and also allows other components of said first electronic control circuit to be applied directly on the surface of the heat shield by thick or thin film technologies. (The first temperature sensor could be formed by application of platinum, nickel or gold to a small ceramic slab by thin-film metallisation techniques.) Direct formation of components on the surface of the heat shield provides a short thermal path from the heater to the second temperature sensor, which, together with the low heat capacity, results in the heat-conducting portion of the heat shield reaching the required temperature more quickly compared with a copper heat-conducting portion of the heat shield. To overcome the above-mentioned problem of a thermal gradient between the heater area and the area of the heat-conducting portion of the heat shield in contact with the skin surface, a thick- or thin-film heating resistor may be applied around the circumference of the heat-conducting portion of the ceramic heat shield close to the end designed for application to the body surface. Alternatively, such a resistor may be applied on the end of the heat-conducting portion of the heat shield designed for application to the body surface itself. In this case, a protective cover layer, for example a thin glass layer, is preferably applied over the resistor to provide a scratch-resistant, insulating and biocompatible surface for contact with the body.

The specific thermal conductivity between the heater or cooler and the surface of the heat-conducting portion of the heat shield which is applied to the surface of the body is preferably more than 2 W/cm$^2$K, more preferably greater than 6.5 W/cm$^2$K. This may be achieved for example by forming the heater on an alumina substrate of thickness 0.38 mm or 0.63 mm. The thermal conductivity may be obtained by multiplying the specific thermal conductivity by area.

Heat-conducting ceramics also offer the advantages of inertness and biocompatibility compared with copper. The disadvantages of heat-conducting ceramics compared with copper are lower thermal conductivity and higher cost. Beryllia has a higher thermal conductivity than alumina, but beryllia parts must be sintered from highly toxic beryllium oxide powder, which is undesirable, and beryllia and aluminium nitride items are also more expensive than those made from alumina.

Preferably, the heat conductivity of said heat-insulating inner portion is 0.2 W/mK or less. Preferably, said heat-insulating inner portion consists of still air, or of a solid material formed by chemical or physical change of a liquid material introduced to the device. More preferably, the heat-insulating solid material is epoxy or polyurethane resin or silicone rubber. These materials preferably entrap a large amount, for example more than 80%, of air cells.

Preferably said heat-conducting portion of the heat shield comprises a heat-conducting cup, having an open end for application to the surface of the body, and said heat-insulating portion of the heat shield comprises a heat-insulating material filling the heat-conducting cup.

The first electronic control circuit may comprise components formed on a thin, flexible printed circuit board, which may be populated with miniature components by the use of standard automated placing machine production. Where the heat shield is constructed from copper, components such as operational amplifiers (in chip form or as miniature packages) may be bonded directly onto the heat shield, for example by soldering. It is desired that the first electronic control circuit contains as few components as possible and is integrated onto the heat shield to minimise power wastage. Alternatively, the first electronic control circuit may comprise a microprocessor.

The said first and second temperature sensors may each independently be thermistors (e.g. NTC or PTC), thermocouples, transistors, temperature measuring ICs (e.g. NSC LM35), or platinum film or wire resistance devices. Where the second temperature sensor is a platinum film or wire resistance device, it may also act as said heater, for example by measuring temperature with AC and heating with DC, or by switching between heating and temperature measurement.

The temperature measuring device is preferably powered by one or more batteries, and more preferably powered by one or more rechargeable batteries, e.g. a lithium battery. It is desirable that recharging is not required more than once a week in normal clinical usage, and that recharging is initiated by placing the deep body temperature device in its charger. The device may optionally be designed to turn off automatically after a certain period to save power.

Preferably the second electronic control circuit is able to store factory calibration tables of the temperature sensors.

Preferably the temperature reading is shown on a digital display, and more preferably a signal is shown on the display to indicate that consecutive deep body temperature predictions are consistent to within a predetermined interval. A suitable interval when measuring human body temperature is 0.1° C.

A clinical thermometer containing a temperature measuring device of the present invention preferably consists of a small, light package, and more preferably has a mass of 100 g or less.

The temperature measuring device may be housed in a small hand-held casing, preferably having a volume of less than 200 cm$^3$, and more preferably having a volume of less than 100 cm$^3$. Said hand-held casing may have one dimension substantially larger than its other two dimensions, for example being a tubular pen-like casing. Said tubular pen-like casing preferably has a diameter of 0.5–2.5 cm, and more preferably a diameter of 1.0–1.5 cm. Said tubular pen-like casing preferably has a length of 5–20 cm, and more preferably a length of 10–15 cm. Alternatively, said hand-held casing may have one dimension substantially smaller than its other two dimensions, for example being a pager-like casing. Said pager-like casing preferably has two dimensions each of 5–10 cm, and preferably has a third dimension of 1–2 cm. Assemblies containing temperature measuring devices of the present invention may optionally have other functions, which are optionally contained in the same housing as the temperature measuring device, for example an ocular reaction light, a reflective pulse oximeter, a stethoscope for detecting heart rate, and/or a timer with an audible signal at the end of a specified period, for example 15 seconds, during which temperature and pulse readings may be taken. Preferably, in this embodiment, a reset switch is used to start both the time period and the temperature measurement. The present invention provides a combination of the Fox probe and predictive circuitry, resulting in a device which is capable of measuring internal temperature from the surface of a body, and which is useful for non-continuous measurements.

DETAILED DESCRIPTION

Figure 1:
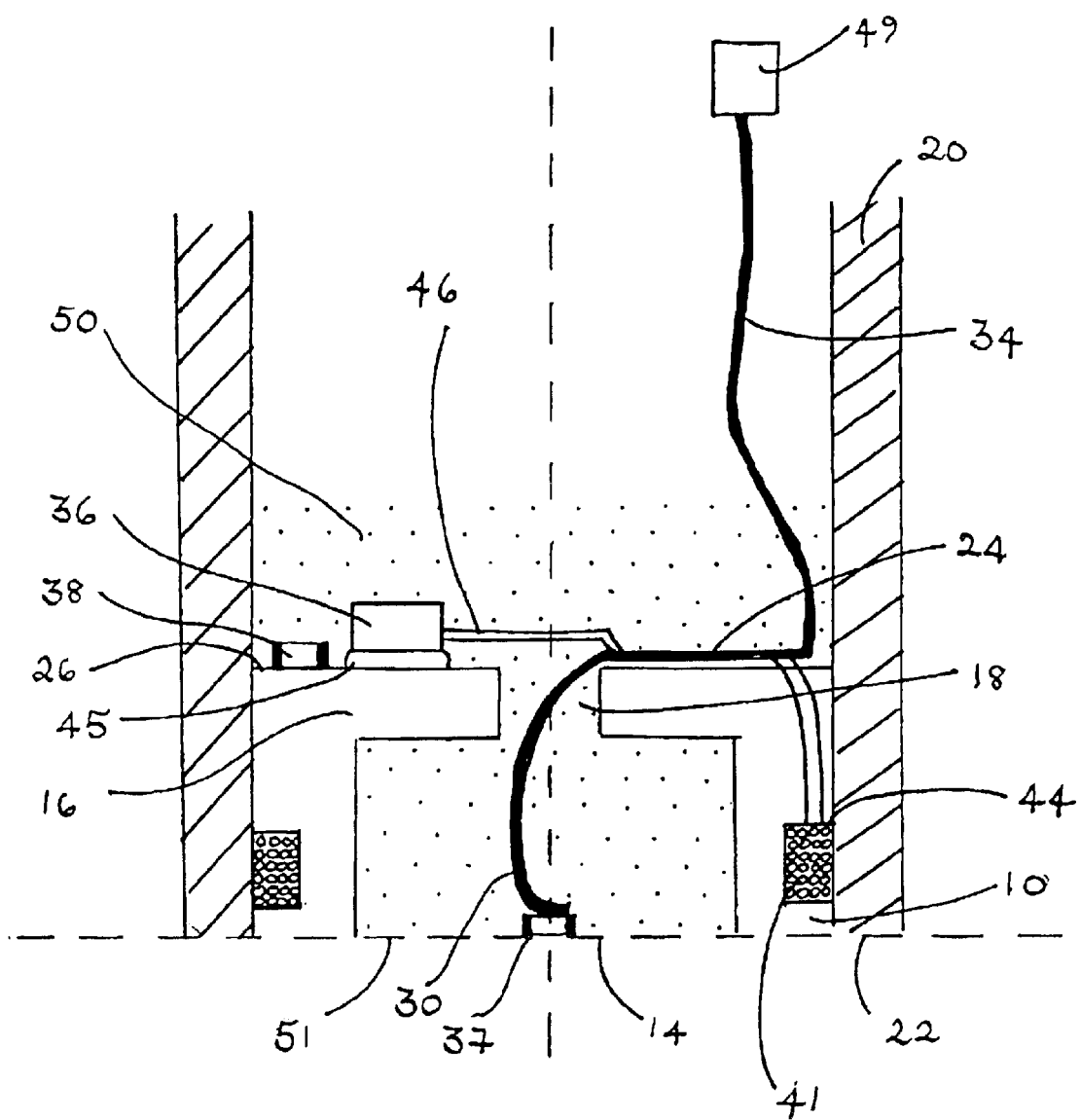
FIG. 1 is a sectional side view of a deep body temperature measuring device of a first preferred embodiment of the present invention.
Figure 2:
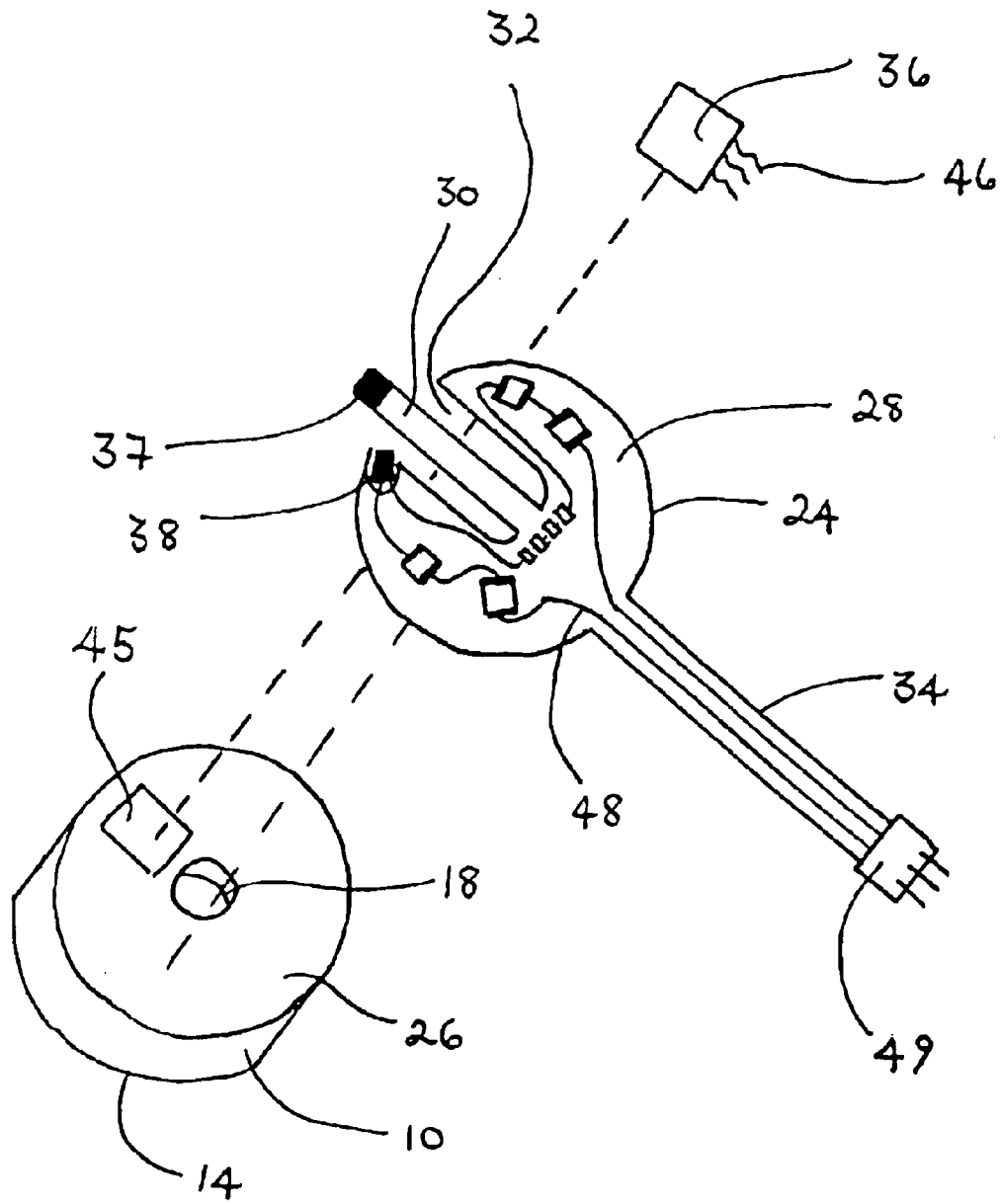
FIG. 2 is an exploded perspective view of selected components of the device of FIG. 1.

The illustrated deep body temperature measuring device of FIGS. 1 and 2 comprises a heat shield, consisting of a copper shield cup 10 having the form of a hollow circular cylinder with a closed end and an opposite open end 14, the closed end comprising a circular disc 16 with a central circular hole 18. The copper shield cup 10 is mounted within a tubular pen-like casing 20 which is circular in cross-section such that the axes of the shield cup 10 and pen-like casing 20 are coincident, and the open end 14 of the copper shield cup 10 is aligned with an open end 22 of the pen-like casing. The pen-like casing 20 may be formed from plastics or metal or other suitable materials.

A thin, flexible printed circuit board 24 is mounted on the outer surface 26 of the circular disc 16. The printed circuit board 24 has the form of a singly notched circle 28 (FIG. 2) with a strip 30 protruding into notch 32 from the centre of the circle, and a long strip 34 extending from the notched circle 28 at the opposite side from the notch 32. The notched circle 28 of the printed circuit board 24 is slightly smaller in diameter than the outer surface 26 of the circular disc 16. Mounted on the printed circuit board 24 by automated SMT pick and place and soldering machines are the components of the first electronic control circuit shown in FIG. 3. The heat fin of a power IC 36 is mounted to disc 16. In particular, a first temperature sensor 37 is mounted at the tip of the strip 30, and a second temperature sensor 38 is mounted by soldering at the point where the notch 32 meets the circle perimeter. In an alternative embodiment, the power IC 36 is not mounted on the heat shield cup 10.

Figure 3:
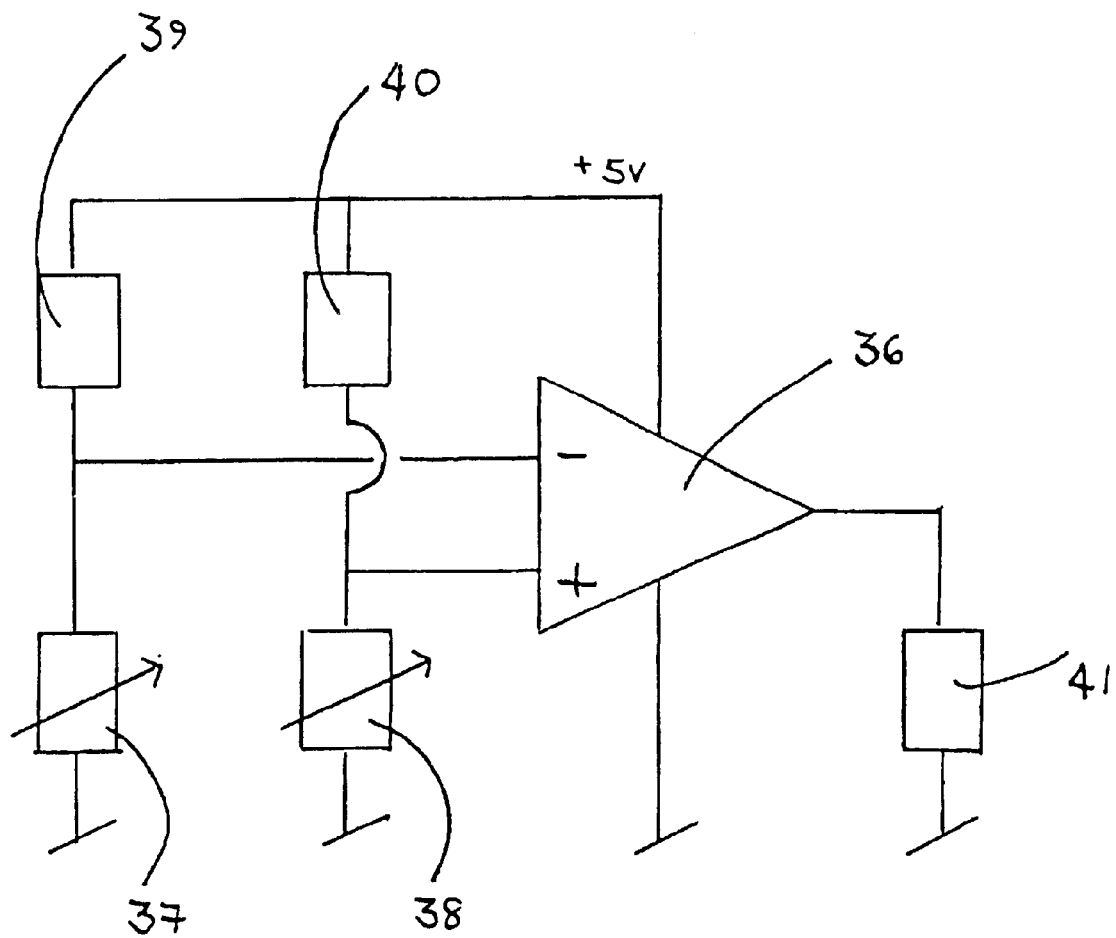
FIG. 3 is a circuit diagram of a first electronic control circuit used in the device of FIG. 1 or FIG. 7.

The first electronic control circuit shown in FIG. 3 comprises the first temperature sensor 37 and the second temperature sensor 38, each being a thermistor. The first temperature sensor 37 is connected in series with a fixed resistor 39, and the second temperature sensor 38 is connected in series with a fixed resistor 40, of equal resistance to the fixed resistor 39. The two potential divider assemblies thus formed are connected in parallel, with a battery (not shown) connected across them. The temperature sensor 37, 38 ends of the potential divider assemblies are grounded. The output between the temperature sensor 37 and the fixed resistor 39, and the output between the temperature sensor 38 and the fixed resistor 40, are connected to the input of the power IC 36 whose output is connected to a heating resistor 41.

Figure 4:
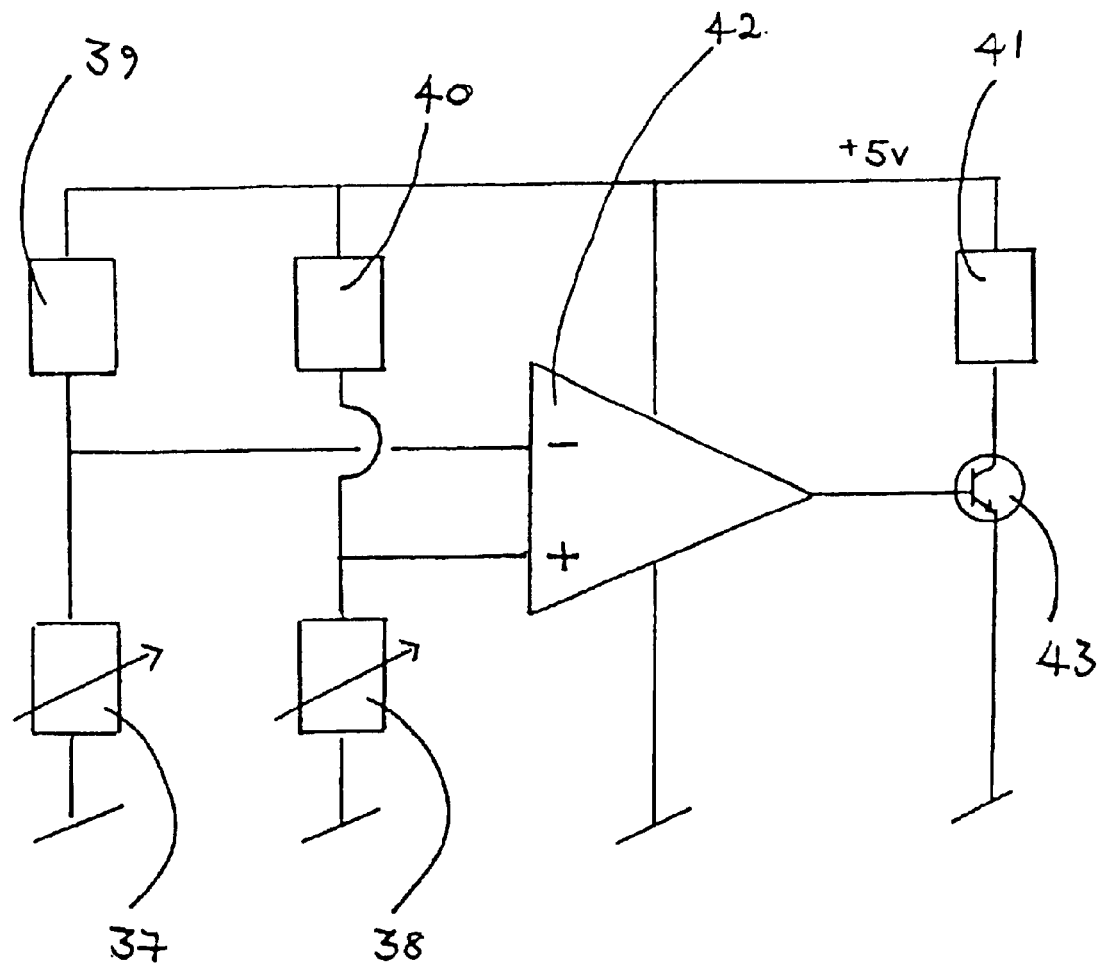
FIG. 4 is a circuit diagram of an alternative first electronic control circuit used in the device of FIG. 1 or FIG. 7.

In the alternative first electronic control circuit shown in FIG. 4, the power IC 36 is replaced by an operational amplifier 42. The output of the operational amplifier 42 is connected to a transistor 43. The transistor 43 is connected in series with the heating resistor 41, with the battery (not shown) connected across this assembly. This circuit has the advantage that the power IC is replaced by cheaper components.

The heating resistor 41 comprises an iron-constantan wire (FIG. 1) coiled around the circumference of the copper shield cup 10 in a recess 44 close to the open end 14. The wire may alternatively be made from copper.

Figure 5:
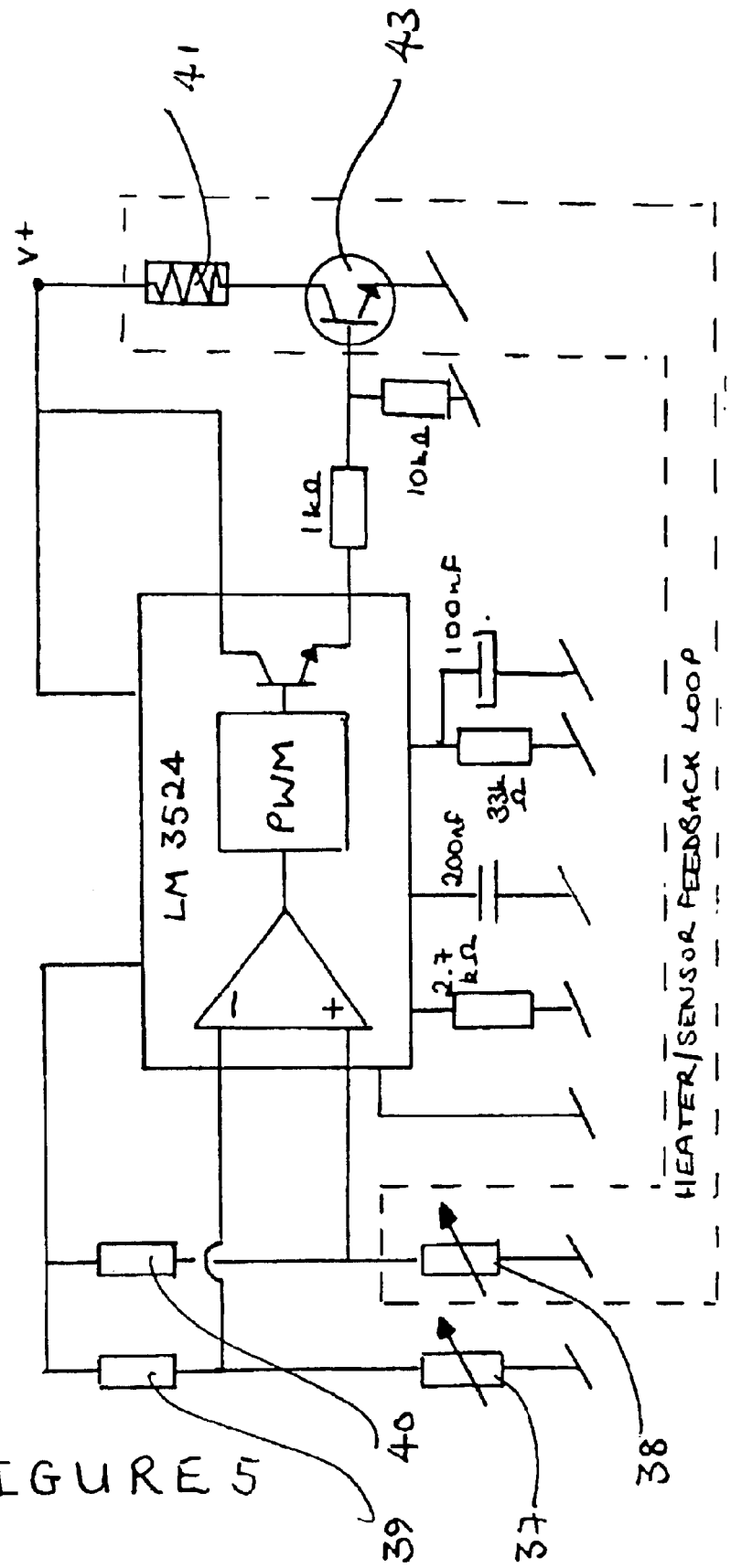
FIG. 5 is a circuit diagram of an alternative first electronic control circuit used in the device of FIG. 1 or FIG. 7.

An alternative first electronic control circuit is shown in FIG. 5. This circuit incorporates a Pulse Width Modulator (PWM) IC between the potential divider assemblies (as described for the first electronic control circuit of FIG. 3) and the transistor 43. The transistor 43 is connected to the heating resistor 41 as in the first electronic control circuit of FIG. 4.

As an alternative to the first electronic control circuits of FIGS. 3, 4 and 5, other electronic controllers which are well known in the art could be used, for example commercially available PID self-tuning devices.

Figure 6:
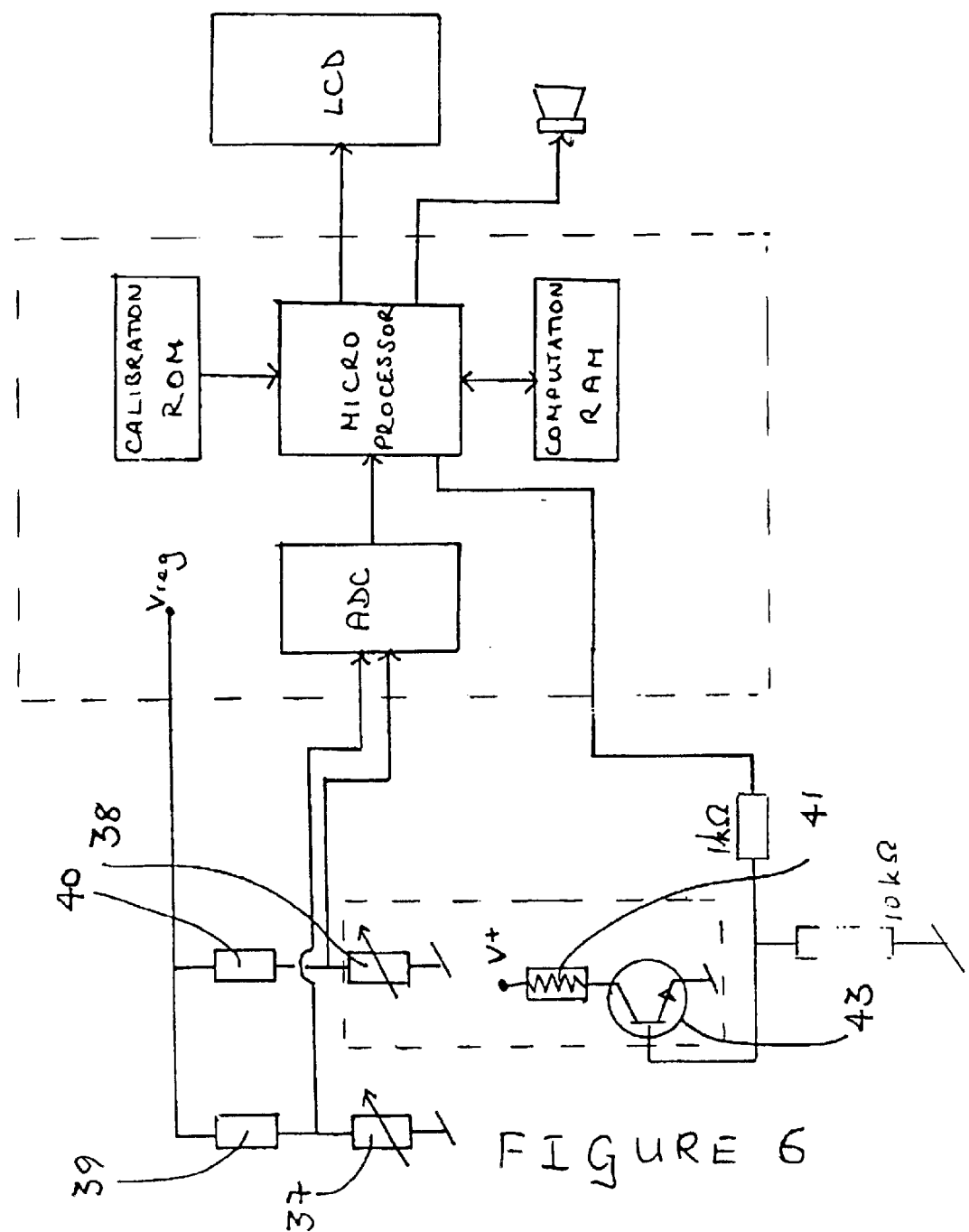
FIG. 6 is a block circuit diagram of the device of FIG. 1 or FIG. 7.
Figure 7:
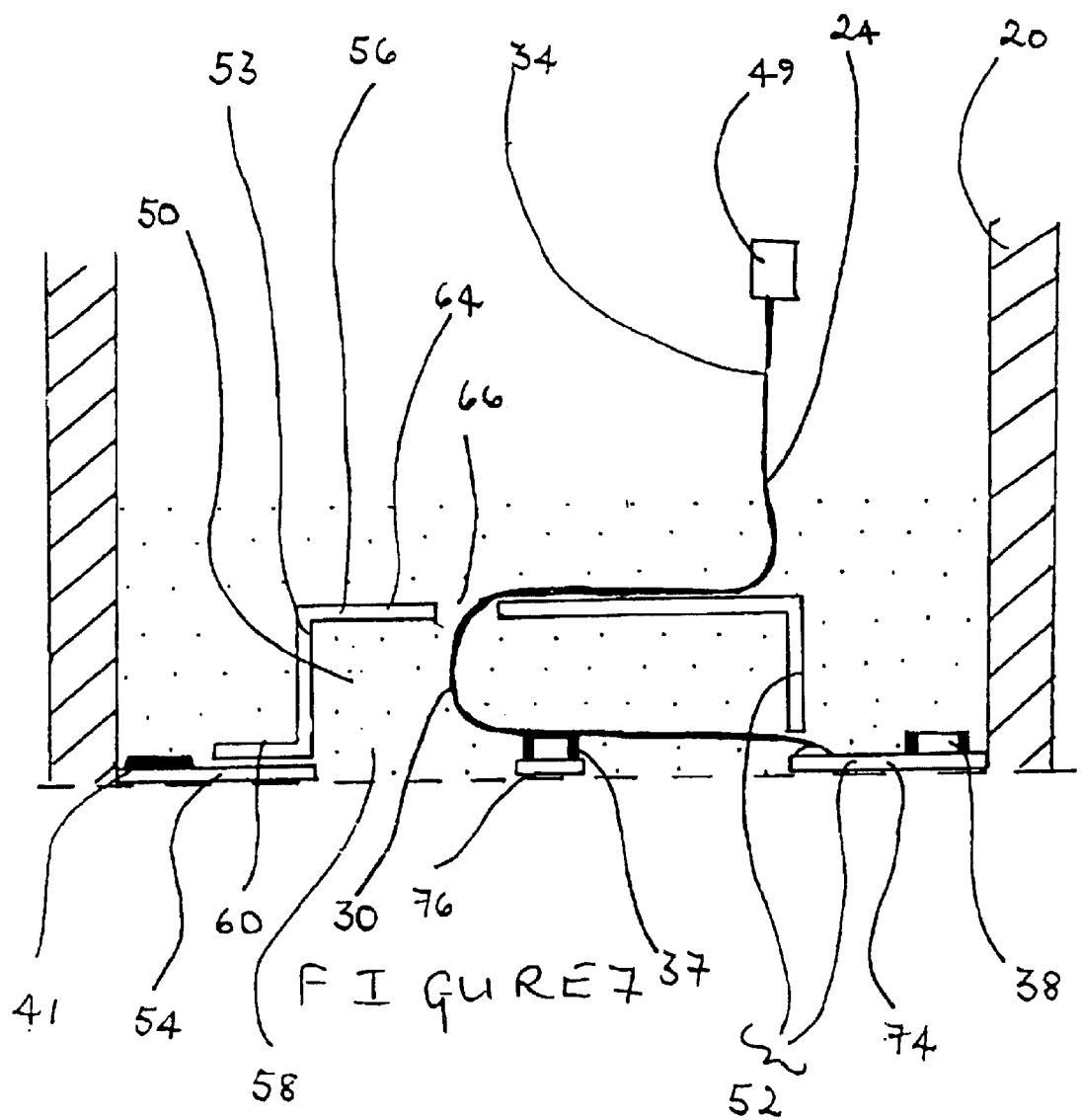
FIG. 7 is a sectional side view of a deep body temperature measuring device of a second preferred embodiment of the present invention.

FIG. 6 shows a block circuit diagram of the device of FIG. 1 or FIG. 7. In this embodiment, a microprocessor forms part of a first electronic control circuit which is equivalent to that shown in FIG. 5. The outputs of the two potential divider assemblies of the first electronic control circuit are connected to the microprocessor, which controls the heating resistor 41. The microprocessor output is connected to a digital-analogue converter. The digital-analogue converter may alternatively be replaced by a pulse width modulator IC. The calibration values of the device are stored in a read only memory connected to the microprocessor. The outputs of the device comprise a liquid crystal temperature display and an audible signal.

When the temperature measuring device is fully assembled, the strip passes through the circular hole 18 in the circular disc 16, such that it is substantially within the copper shield cup 10. The tip of the strip 30, whereon the first temperature sensor 37 is mounted, is positioned such that the first temperature sensor 37 is aligned with the open end 14 of the copper shield cup 10, and lies on the axis of the copper shield cup 10.

An area 45 of the outer surface 26 of the copper shield cup 10 is exposed by the notch 32 in the printed circuit board 24. The power IC 36 is soldered to the copper shield cup 10 at the area 45. The power IC 36 is connected to the first electronic control circuit by pins 46. The second temperature sensor 38 is also held in contact with the area 45 of the outer surface 26 of the copper shield cup 10.

Printed circuit board tracks 48 from the first electronic control circuit extend along the long strip 34 of the printed circuit board 24. The long strip 34 extends inside the pen-like casing 20 away from the end 22. At the end of the long strip 34, the printed circuit board tracks 48 are joined via a connector 49 to a microprocessor and battery (not shown), which are further connected to a display (not shown).

All the above components are held in place by potting with epoxy resin 50.

To use the illustrated embodiment of the invention to take a human deep body temperature reading, end 51 of the device, comprising the open end 14 of the copper shield cup 10 and the open end 22 of the pen-like casing 20, is held flat against the skin, such that the first temperature sensor 37 is in contact with the skin and registers the skin temperature. This temperature is higher than that registered by the second temperature sensor 38, which is not in contact with the skin. The temperature sensors 37, 38 are thermistors, and the resistance of the first temperature sensor 37 is thus lower than the resistance of the second temperature sensor 38. The potential divider assemblies described above will cause the potential difference across the first temperature sensor 37 to be lower than the potential difference across the second temperature sensor 38. Consequently, the potential divider output potentials connected to the power IC 36 will differ, giving rise to an output current through the heating resistor 41. This results in the copper shield cup 10 being heated by the heating resistor 41. Current through the power IC 36 causes a small additional heating effect of the copper shield cup 10.

In the alternative first electronic control circuit shown in FIG. 4, different potentials connected to the operational amplifier 42 will give an output voltage which causes the transistor 43 to allow current to pass through the heating resistor 41. When this circuit is used, the transistor 43 is preferably soldered to the copper shield cup 10 so that any heat generated by the passage of current through the transistor 43 is not wasted. The pulse width modulator IC of the alternative first electronic control circuit of FIG. 5 outputs a constant train of fast pulses (about 15 000/s) to the transistor 43 and heating resistor 41. When the temperature registered by the second temperature sensor 38 is lower than that registered by the first temperature sensor 37, the width of these pulses is large (about 90% duty cycle), giving a large current through the heating resistor 41. As the temperatures become close, the pulse width is reduced and reaches 0% duty cycle (zero power) if the temperature registered by the second temperature sensor 38 is higher than that registered by the first temperature sensor 37. The regulation round the switching point in this circuit is fast and well within 0.1° C. This means that temperature control is smoother and faster compared with the circuits shown in FIGS. 3 and 4.

As explained above, the first electronic control circuit causes the heating means to be switched on, causing the copper shield cup 10 to be sufficiently heated so that the temperature registered by the second temperature sensor 38, in contact with the copper shield cup 10, rises towards the same temperature as the first temperature sensor 37. This reduces the thermal gradient across the insulating epoxy resin 50. Heat transferred outwards from the core of the body to the skin causes an increase in the skin temperature registered by the first temperature sensor 37. The first electronic control circuit continues to cause the copper shield cup 10 to be heated towards this temperature, and by this process the temperature sensors 37 and 38 tend exponentially towards the deep body temperature.

A second electronic control circuit within the microprocessor uses the Marquard-Levenberg algorithm (described in Transforms and Curve Fitting by John Kuo, Emma Fox, Dick Mitchell and Thomas Tuerke, Revision SPD1.2 August 1992, Jandel Scientific GmbH, Schimmelbuschstr. 25, D-40599 Ekreth, Germany) to predict the end value of the decaying temperature change (i.e., the deep body temperature) from a continuous and consecutive series of data points (e.g. 10 per second), preferably to within 0.1° C. The microprocessor then causes this value to be displayed on the display.

Figure 8:
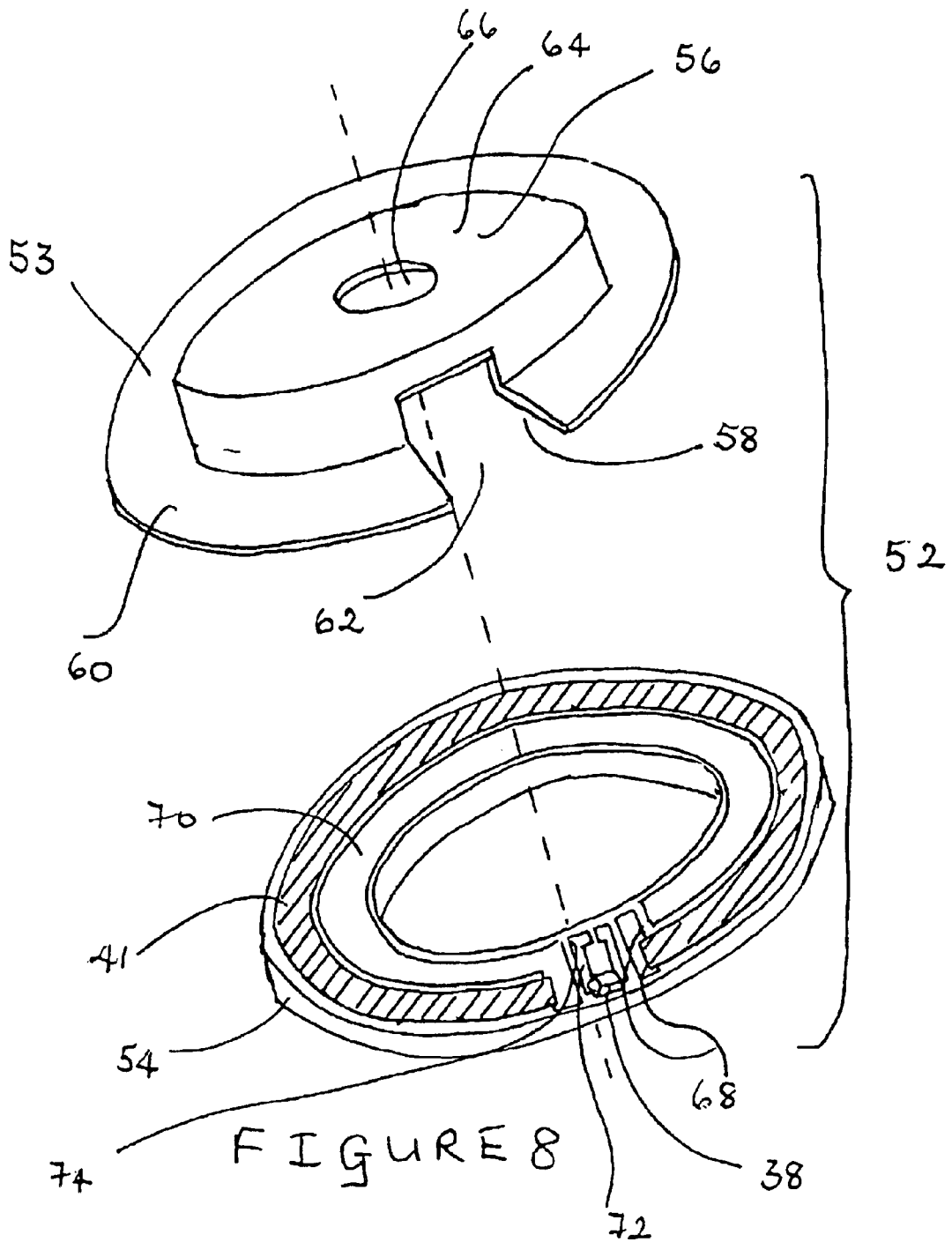
FIG. 8 is an exploded perspective view of selected components of the device of FIG. 7.

FIGS. 7 and 8 show an alternative design for the deep body temperature measuring device. In this design, a composite heat shield cup 52 is formed from a thin copper shield cup 53 attached to an alumina ring 54. The thin copper shield cup 53 is hat-shaped, comprising a thin hollow circular cylinder with a closed end 56 and an opposite flanged open end 58. A flange 60 at the open end 58 extends outwardly perpendicular to the cylinder axis and contains a single notch 62. The notch 62 extends into the cylinder wall. The closed end 56 of the thin copper shield cup 53 comprises a circular disc 64 with a circular off-centre hole 66.

The alumina ring 54 is 0.38 mm thick, with the same inner diameter as that of the thin copper shield cup 53 but with a larger outer diameter than the flange 60. The alumina ring 54 is printed on one surface with two concentric rings (FIG. 8), both singly notched with the notches 68 aligned. The inner ring is a solder ring 70 and the outer ring is a printed and fired resistor 41. Solder terminals 72 and the second temperature sensor 38 are attached by soldering to the unprinted area 74 of the alumina ring surface.

The alumina ring 54 is soldered by means of the solder ring 70 to the flange 60 of the thin copper shield cup 53 with the notches 62 and 68 aligned.

The composite heat shield cup 52 is the equivalent of the copper shield cup 10 of the device of FIG. 1, and is mounted within the tubular pen-like casing 20 in the same way. The printed circuit board 24 is attached to the composite heat shield 52 as to the copper shield cup 10 and the first temperature sensor 37 on the strip 30 is positioned within the composite heat shield cup 52, but the first temperature sensor 37 is formed on a thin ceramic slab 76. The printed circuit board strip 30 of the device of FIG. 7 extends through the hole 66 in the circular disc 64 past the first temperature sensor 37 to the area 74 of the alumina ring 54 surface, where the printed circuit board tracks 48 are connected to the second temperature sensor 38 via the solder terminals 72.

As in the device of FIG. 1, the printed circuit board tracks 48 on the long strip 34 of the printed circuit board 24 are joined via the connector 49 to the microprocessor, battery and display (not shown). As in the device of FIG. 1, all the components are held in place by potting with epoxy resin 50. The epoxy resin 50 may be replaced by highly foaming polyurethane.

In a variant of the device of FIG. 7 (not shown), a flexible disc-shaped printed circuit board 24 is bonded at its perimeter to a cylindrical support ring which fits closely within the heat shield cup 52, such that the printed circuit board 24 caps the open end 58 of the heat shield cup 52. The printed circuit board 24 fixes the first temperature sensor 37 in place. The printed circuit board extends beyond the support ring through the notch 62, connecting to the solder terminals of resistor 41 and second temperature sensor 38, before continuing by the long printed circuit board strip 34 to the microprocessor via the connector 49. This embodiment has the advantage that the printed circuit board 24 and cylindrical support ring form a stethoscope arrangement, so that it is possible to detect pulse sounds by attaching a microphone to the hole 66 in the disc 64 directly or through a short tube. The pulse sounds can be electronically processed to give a heart rate reading displayed with the core temperature reading.

Any of the first electronic control circuits shown in FIGS. 3, 4, 5 and 6 and described above may be used with the design of FIGS. 7 and 8 (the power IC 36 of the first electronic control circuit of FIG. 3 is not shown in FIGS. 7 and 8). The device of FIGS. 7 and 8 operates in the same way as the device of FIGS. 1 and 2.

Figure 9:
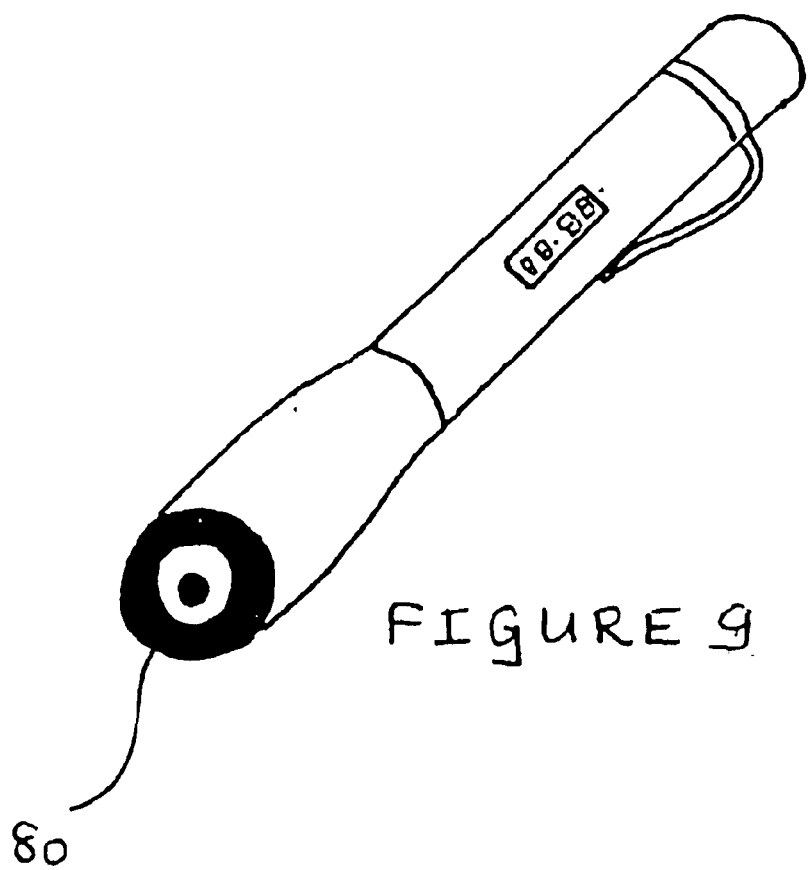
FIG. 9 is a perspective view of a pen-like casing housing a device of FIG. 1 or FIG. 7.
Figure 10:
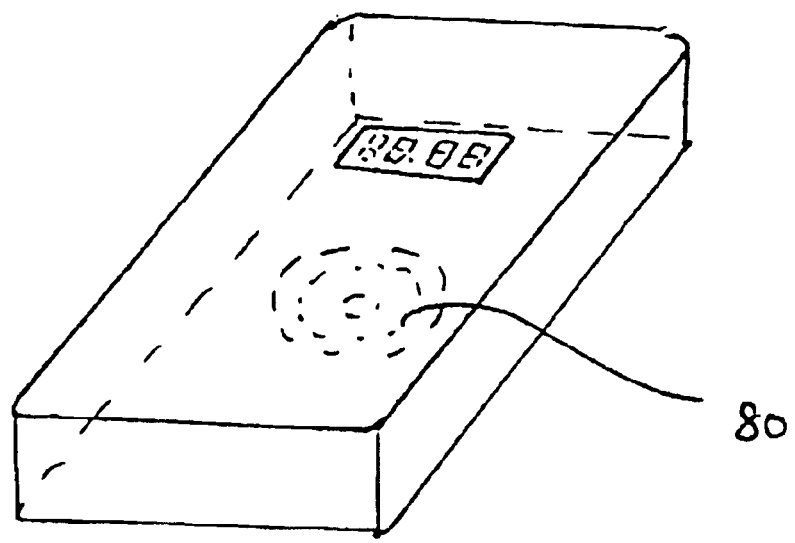
FIG. 10 is a perspective view of a flat casing housing a device of FIG. 1 or FIG. 7.

The illustrated embodiments of the present invention provide a non-invasive thermometer based on the Fox probe but using advanced microprocessor and materials technology, which may be produced in small, light assemblies suitable for use as clinical thermometers, for example housed in a pen-like casing as shown in FIG. 9 or in a flat casing as shown in FIG. 10. In each case the Fox Probe 80 is shown. The device of FIGS. 7 and 8 has the additional advantage that in clinical use there is no copper-skin contact.

Where the pen-like casing shown in FIG. 9 is used, a bulb or white LED may be placed behind the heat shield cup 10 to form a light integral with the thermometer. Where a ceramic or part-ceramic heat shield cup is used, light will pass through the translucent ceramic material. Alternatively, a light guide (for example a glass or perspex tube) may be used to guide light through the heat shield cup 10.

Thermometers of the present invention give clinical temperature measurement results which are as fast and convenient as the optical ear canal devices discussed above, but which offer the advantages of lower patient discomfort and higher clinical accuracy. No clinical knowledge is needed to use such a device, and because the device is used on the surface of the skin it may be simply wiped with a disinfectant cloth between patients, removing the need for disposable parts which must be used with ear canal thermometers. Thermometers of the present invention may also be used to measure the temperature within non-organic bodies, e.g. industrial process tanks, or to measure the temperature within frozen food without breaking the packaging.

Whilst the invention has been described with reference to the illustrated preferred embodiments, it is to be appreciated that many modifications and variations are possible within the scope of the invention.

What is claimed is:

1. A temperature measuring device for measuring the temperature within a body from a surface of the body, said device comprising:
   a heat shield for application to the surface of the body, comprising an outer heat-conducting portion, and an inner heat-insulating portion, both said portions having a surface for contacting said surface of the body;
   a temperature controlling element positioned to control the temperature of the outer portion of said heat shield to the temperature of the surface of the body so as to annul heat flow from a measurement location within the area of said surface to which the heat shield is applied, said temperature controlling element being close to said surface of the outer portion of the heat shield which is applied to the surface of the body compared with its distance from an opposite surface of the outer portion of the heat shield;
   a first temperature sensor positioned on said surface of the inner heat-insulating portion of the heat shield for contacting the surface of the body to measure the temperature of said surface at said measurement location;
   a second temperature sensor positioned to measure the temperature of said outer portion of the heat shield;
   a first electronic control circuit serving to operate said temperature controlling element so as to change the temperature of said outer portion of the heat shield as measured by said second temperature sensor towards the temperature at said measurement location as measured by said first temperature sensor; and
   a second electronic control circuit serving to extrapolate changing temperatures measured by said first temperature sensor to forecast what the temperature at said measurement location would be at thermal equilibrium.

2. A temperature measuring device as claimed in claim 1, wherein said temperature controlling element comprises an electrically resistive heating element in contact with said outer portion of the heat shield.

3. A temperature measuring device as claimed in claim 2, wherein said heating element is embedded in said outer portion of the heat shield.

4. A temperature measuring device as claimed in claim 1, further comprising a control connected to activate said temperature controlling element to control the temperature of the heat shield before making a temperature measurement.

5. A temperature measuring device as claimed in claim 1, wherein said temperature controlling element is a Peltier effect heat pump.

6. A temperature measuring device as claimed in claim 1, wherein the specific thermal conductivity between the temperature controlling element and the surface of the heat-conducting portion of the heat shield for application to the surface of the body is 2 W/cm²K or more.

7. A temperature measuring device as claimed in claim 6, wherein the specific thermal conductivity between the temperature controlling element and the surface of the heat-conducting portion of the heat shield for application to the surface of the body is 6.5 W/cm²K or more.

8. A temperature measuring device as claimed in claim 1, wherein the heat conductivity of said heat-conducting portion of the heat shield is at least 20 W/mK.

9. A temperature measuring device as claimed in claim 1, wherein said heat-conducting portion of the heat shield is constructed from heat-conducting metal.

10. A temperature measuring device as claimed in claim 9, wherein said heat-conducting metal is one of copper, brass and stainless steel.

11. A temperature measuring device as claimed in claim 1, wherein said heat-conducting portion of the heat shield is constructed from heat-conducting ceramic material.

12. A temperature measuring device as claimed in claim 11, wherein said heat-conducting ceramic material comprises at least one of alumina, beryllia and aluminium nitride.

13. A temperature measuring device as claimed in claim 11, wherein at least one of the temperature controlling element and the first temperature sensor comprises components of at least one of platinum, nickel and gold applied directly onto said ceramic heat shield by thin-film metallisation techniques.

14. A temperature measuring device as claimed in claim 11, wherein at least one of said temperature controlling element and said first temperature sensor comprises a layer of at least one of a metal, metal, a metal alloy and a metal oxide applied directly onto said ceramic heat shield.

15. A temperature measuring device as claimed in claim 14, wherein the layer comprises at least one of platinum and gold.

16. A temperature measuring device as claimed in claim 11, wherein said first electronic control circuit comprises components applied to said ceramic heat shield by one of thick and thin film technologies.

17. A temperature measuring device as claimed in claim 1, wherein said heat-conducting portion of the heat shield is constructed from copper and heat-conducting ceramic material.

18. A temperature measuring device as claimed in claim 1, wherein the conductivity of said heat-insulating inner portion is 0.2 W/mK or less.

19. A temperature measuring device as claimed in claim 18, wherein said heat-insulating solid material comprises at least one of epoxy, polyurethane resin and silicone rubber.

20. A temperature measuring device as claimed in claim 1, wherein said heat-insulating inner portion comprises a solid material formed by chemical or physical change of a liquid material introduced to the device.

21. A temperature measuring device as claimed in claim 1, wherein said heat-conducting portion of the heat shield comprises a heat-conducting cup, having an open end for application to the surface of the body, and said heat-insulating inner portion of the heat-shield comprises a heat-insulating material filling said heat-conducting cup.

22. A temperature measuring device as claimed in claim 1, wherein said first electronic control circuit comprises heat producing parts bonded directly onto said outer portion of the heat shield.

23. A temperature measuring device as claimed in claim 1, wherein said first and second temperature sensors are each one of a thermistor, a thermocouple, a transistor, a temperature measuring IC, a platinum film and a wire resistance device.

24. A temperature measuring device as claimed in claim 1, comprising one or more batteries for providing electrical power to electrically-based elements in the device.

25. A temperature measuring device as claimed in claim 1, wherein said temperature controlling element includes a heater.

26. A temperature measuring device as claimed in claim 1, wherein said temperature controlling element includes a cooler.

27. A temperature measuring device as claimed in claim 1, further comprising a housing containing at least said heat shield, said temperature controlling element and said first and second temperature sensors.

28. A temperature measuring device as claimed in claim 27, further comprising an ocular reaction light source disposed within said housing.

29. A temperature measuring device as claimed in claim 27, further comprising a reflective pulse oximeter disposed within said housing.

30. A temperature measuring device as claimed in claim 27, further comprising a timer disposed within said housing, said timer producing an audible signal at the end of a specified period.

31. A temperature measuring device as claimed in claim 27, further comprising an acoustic sensor disposed within said housing for detecting heart rate.

32. A temperature measuring device as claimed in claim 27, wherein said housing is elongated in one dimension, the first temperature sensor being located at one end of the elongated housing.

33. A temperature measuring device as claimed in claim 27, wherein said housing has is substantially smaller in one dimension than the other two dimensions, the first temperature sensor being located on a face of the housing.

* * * * *